United States Patent [19]
Fleming

[11] Patent Number: 5,953,710
[45] Date of Patent: Sep. 14, 1999

[54] CHILDREN'S CREDIT OR DEBIT CARD SYSTEM

[76] Inventor: Stephen S. Fleming, 180 Mallorca Way, San Francisco, Calif. 94123

[21] Appl. No.: 08/727,979

[22] Filed: Oct. 9, 1996

[51] Int. Cl.⁶ .................................................. G06F 15/30
[52] U.S. Cl. ............................... 705/38; 705/39; 705/35; 235/380
[58] Field of Search .................................. 705/38, 35, 39; 235/380; 902/26

[56] References Cited

U.S. PATENT DOCUMENTS

| | | |
|---|---|---|
| 4,837,422 | 6/1989 | Dethloff et al. .......................... 705/38 |
| 5,500,513 | 3/1996 | Langhans et al. . | |

OTHER PUBLICATIONS

Peter Sinton, "Visa Wants To Kill Cash," *San Francisco Chronicle*, p. B1, Oct. 11, 1995.
Robert Heady, "Brokers Compete With Lenders," *The Denver Post*, p. J–14, Nov. 19, 1995.
Simson L. Garfinkel, "Companies Rush to Say 'Buy–Buy' Over Net," *San Jose Mercury News*, p. 1E, Oct. 1, 1996.
Mike Langberg, "Verifone Wants to Plug in to Cash," *San Jose Mercury News*, p. 1E, Oct. 1, 1996.
John Swenson, "Filing Expense Via American Express," *Information Week*, p. 103, Jul. 1, 1996.
Michael Gianturco, "Digital Cash," *Forbes*, p. 164, Aug. 14, 1995.
1st Nationwide Bank, "Electronic Banking Services Disclosure," effective Sep. 8, 1994.
Thomas Hoffman, "The Check'in the E–Mail," *Computerworld*, p. 57, Sep. 4, 1995.
Glendale Federal Bank, "An Open Letter From Steve Trafton, President of Glendale Federal Bank," advertisement from *San Francisco Chronicle*, p. 20, Mar. 30, 1996.
"MasterCard International: Products and Services," press release printed from http://www.mastercard.com/Info/products.htm (MasterCard International World–Wide–Web Site) on May 12, 1996.
"MasterCard Outlines Stratagies for Staying Ahead in a Changing World," press release dated Apr. 12, 1995, printed from http://www.mastercard.com/Press/release–950412.htm (MasterCard International World–Wide–Web Site) on May 12, 1996.
"Wells Fargo—Personal Finance—Credit Cards," press release printed from http://www.wellsfargo.com/per/percon/pconcd/ (Wells Fargo World–Wide–Web Site) on May 12, 1996.
"Wells Fargo—Personal Finance—Gold Cards," press release printed from http://www.wellsfargo.com/per/percon/pconcd/gold (Wells Fargo World–Wide–Web Site) on May 12, 1996.

(List continued on next page.)

*Primary Examiner*—Allen R. MacDonald
*Assistant Examiner*—Penny Caudle
*Attorney, Agent, or Firm*—McCutchen, Doyle, Brown & Enersen, LLP

[57] ABSTRACT

Methods and credit or debit card systems are disclosed that allow the available credit to be determined by someone other than the card issuer and that allow a limit to be set on the number of expenditures that can be made. The methods and systems can be used to provide a mechanism for supervising credit or debit card usage. Methods and systems are disclosed which include a child's credit card account linked to a parent's credit or debit card account. The parent may change the child's available credit without changing the total combined available credit for the child's and the parent's accounts. In addition, an expenditure counter figure associated with the child's account is disclosed which can be used by the parent to enable the child to make an unlimited number of purchases, a limited number of purchases, or no purchases. The parent may make a single payment for both the child's and the parent's credit card accounts. The methods and systems disclosed may be used outside of the parent/child context whenever supervision is required. They may also be used by a single individual to provide limited credit card usage in less secure environments.

38 Claims, 12 Drawing Sheets

OTHER PUBLICATIONS

"Wells Fargo—Personal Finance—Student Visa Card," press release printed from http://www.wellsfargo.com/per/perstu/stuvis/ (Wells Fargo World–Wide–Web Site) on May 12, 1996.

"What's New at Bank of America's Homebanking," press release printed from http://www.BankAmerica.com/p-finance/homebanking.html (Bank of America World–Wide–Web Site) on May 12, 1996.

"Payment Card Organizations Detail Next Steps on Global Chip Card Specifications," press release dated May 31, 1995, printed from http://www.mastercard.com/Press/release–950531.htm (MasterCard International World–Wide–Web Site) on May 12, 1996.

"Products," press release printed from http://magtek.com/product.html (Mag–Tek World–Wide–Web Site) on May 12, 1996.

"FAQ," press release printed from http://www.magtek.com/faq.html (Mag–Tek World–Wide–Web Site) on May 12, 1996.

"Major 1995 Card Products," press release printed from http://www.ramresearch.com/cardtrak/ct_dec95b.html (CardTrak World–Wide–Web Site) on May 12, 1996.

"New Bravo Card," press release printed from http://www.ramresearch.com/cardtrak/ct_sep95b.html (CardTrak World–Wide–Web Site) on May 12, 1996.

"Chase Manhattan, Citibank, MasterCard and Visa Join Forces to Launch Pilot Program," press release dated Apr. 10, 1996, printed from http://www.mastercard.com/Press/release–960410.htm (MasterCard International World–Wide–Web Site) on May 12, 1996.

"Helping Shape the Future of Money in Australia," press release dated Mar. 25, 1996, printed from http://www.mastercard.com/Press/release–960325–786.htm (MasterCard International World–Wide–Web Site) on May 12, 1996.

"Rebate Card Background," press release printed from http://www.ramresearch.com/cardlearn/rebate.html? on May 12, 1996.

"American Express Launches Corporate Platinum Card," press release dated Oct. 31, 1995, printed from http://www.americanexpress.com/corp/latestnews/plat.html (American Express World–Wide–Web Site) on May 12, 1996.

"Expressnet From American Express Debuts on America Online," press release dated Jan. 30, 1995, printed from http://www.americanexpress.com/corp/latestnews/expressnet.html (American Express World–Wide–Web Site) on May 12, 1996.

"The Cards FAQ," press release printed from http://www.americanexpress.com (American Express World–Wide–Web Site) on May 12, 1996.

"Discover Card Features," press release printed from http://www.discovercard.com (Discover Card World–Wide–Web Site) on May 12, 1996.

"Presenting the Discover Card Youth Program," press release printed from http://www.discovercard.com (Discover Card World–Wide–Web Site) on May 12, 1996.

"Wells Fargo—Small Business Banking—Alaska," press release printed from http://wellsfargo.com/biz/bizmon/features/ on Dec. 6, 1996.

"Overview of VeriFone's Payment Solution," press release printed from http://www.verifone.com (VeriFone World–Wide–Web Site) on May 12, 1996.

A Children's Credit Card Transaction Records

A Children's Credit Card Approval Processing

A Children's Credit Card
Bank Accounts Database
Parent Request Transaction Record A Children's Credit Card Parent Decrease Request A Children's Credit Card Parent Disable Request A Children's Credit Card Parent Limit Request

CHILDREN'S CREDIT OR DEBIT CARD SYSTEM

BACKGROUND

Credit and debit cards are used widely around the world as a form of payment for goods. The widespread popularity and worldwide use of credit and debit cards stem from benefits of this form of payment over alternatives such as cash or checks. For example, when purchases are made with credit or debit cards, it is not necessary to carry sufficient cash to make purchases. Purchases made with credit cards provide a receipt and are itemized on monthly statements. Also, liability due to loss of a credit card is limited.

Credit and debit cards are issued to individuals or entities by banks and others in order to provide their customers these benefits. With respect to credit cards, after completing a satisfactory application and signing an agreement to make payments for all purchases made with the credit card, a customer is issued a card with identifying information. The customer can then provide this card, or simply provide the card's identifying information, to merchants in order to make a purchase. In current credit card systems today, a credit card purchase typically involves three steps. The first step, Authorization, checks that the card has sufficient "available credit" for the expenditure amount to be approved. When an authorization is granted, the card's available credit is reduced by the expenditure amount, but the transaction is not yet complete. A second step, Capture, actually debits the account holder's account, creating an expenditure transaction record. Often a merchant will capture an entire day's worth of credit card transactions in one large batch operation after the end of the business day. If an expenditure is authorized but not captured, the authorization will expire after a certain number of days and the account holder will not see a transaction on their statement. The third step, Settlement, is when the funds are actually transferred to the merchant for the account holder's payment. If an account holder returns merchandise and receives a full refund credit prior to Settlement, then the funds will not be transferred to the merchant. Each of these steps may be performed by a separate bank or other processing entity. Typically, there are three entities involved in processing: a Merchant Bank, where a business has its banking accounts, an Acquiring Bank, which accepts credit card transactions on behalf of the Merchant Bank, and an Issuing Bank, which issues credit cards to customers.

Typical credit card accounts have a single Credit Limit which is controlled by the card issuer. The initial available credit of an account holder's account is set equal to the Credit Limit. The dollar amount of a purchase made by the account holder is subtracted from the available credit. When a payment is made to the credit card account, the available credit is raised by the amount of the payment. While Credit Limit increases and decreases may be requested by the account holder, changes in the Credit Limit must be authorized by the card issuer. In addition, Credit Limits are sometimes unilaterally increased by the credit card issuer. Credit cards also may permit the account holder to withdraw cash or write drafts. Occasionally, a credit card may have separate credit limits for cash withdrawals and purchases. The normal relation between an account's credit limit and available credit is expressed by the equation: available credit=credit limit—account balance due. Thus, changes in the credit limit of a credit card typically imply changes in the available credit. When a bank increases an account holder's Credit Limit, this results in a corresponding increase in their available credit, as given by the above equation. Although several credit cards may be issued for one credit card account, all transactions made with any of the cards are treated identically.

Some credit card accounts have no customer known Credit Limit. Purchases are allowed without reference to a fixed credit limit or available credit figure. Customer balances and charges are processed using analytical and heuristic techniques to spot fraud, unusual spending patterns, or expenses which may be beyond the ability of the account holder to pay. Unusually expensive purchases typically require additional verification of the identity of the individual using the card. When total outstanding expenditures are computed to be beyond the estimated ability of the account holder to pay, an additional purchase may be refused by the bank. Therefore these cards also have a credit limit, although the limit is not explicitly known by the customer.

Typical debit cards function essentially as electronic checks drawn against the account holder's bank checking account. For a debit card, the "available credit" is equal to the available balance in the account holder's bank account. Increases in the available credit require an actual deposit of funds, into the associated bank account, which must be approved by the bank. For example, checks deposited to an account are often subject to a hold policy of several days until the deposited funds are authorized as "available" by the bank. The account used by a debit card may support other capabilities of a regular bank account, including Automated Teller Machine access.

A recent American Bankers Association report indicates that 3.53 percent of bank credit card accounts are 30 days or more overdue. Another report by the RAM Research Group shows credit card delinquency rates on a dollar basis to be 4.33 percent. There is a need for a system by which children can learn to use credit and debit cards wisely. In addition, there are situations in which a system is needed to provide a method of supervising card usage. For example, supervised credit or debit cards may protect a mentally infirm elderly person from fraud by allowing supervision of large expenditures. In addition, employers may wish to supervise their employees' use of credit cards for business expenses.

The use of credit and debit cards by children currently is limited due to drawbacks with existing systems including:

Inability of Parents to Control Expenditure Amounts: Parents often prefer to supervise a child's expenditures on a case by case basis, since expenditures may vary widely from the cost of lunch to the cost of a new bicycle. A single credit or debit limit large enough for any expenditure does not allow a parent to supervise the child's smaller purchases. Furthermore, current credit and debit card systems provide for a limit which cannot be changed without bank approval. Therefore, parental control of a child's credit or debit card expenditures is limited with current systems.

Inability of Parents to Control Number of Expenditures: Often a parent desires to provide a child with a method of making a limited number of expenditures. Current credit card systems provide no mechanism for parents to limit the number of expenditures made by a child.

Payment Drawback: Typically a parent may simply wish to pay for a child's expenditure without automatically allowing more expenditures. However, in current credit card systems, paying a credit card's balance due results in a corresponding increase in the credit card's available credit.

Accordingly, there is a need for credit or debit card methods and systems that address the disadvantages described above and improve on the methods and systems currently in use.

SUMMARY

The present invention encompasses a method and a credit or debit card system that allows a limit to be set on the number of expenditures that can be made and allows the available credit to be determined by someone other than the card issuer. The method and system can be used to provide a mechanism for supervising credit or debit card usage.

One type of preferred embodiment of a method and system according to the present invention includes a separate credit card account for a child which is linked with a parent's credit card account. The method and system allow: a parent to make changes in the child's available credit without changing the total combined credit limit and available credit for the child's and parent's credit card accounts and without requiring bank approval; the child's purchases to be included in the parent's statement; the parent to enable the child to make purchases unlimited in number, a limited number of purchases, or no purchases; and the parent to make a single payment for both the child's and the parent's credit card accounts. In a preferred embodiment of the invention, both the child's and parent's accounts are credit card accounts. While the invention is described in the context of a parent and child, this invention can be used whenever supervision would be helpful, such as when an adult son or daughter supervises a mentally infirm elderly parent. The invention may also be used by a single individual to provide a supervised card for use in less secure environments.

In another preferred embodiment of the invention, a parent's account is a debit card account.

In another preferred embodiment of the invention, the child's account is a debit card account and the parent's account is a credit or debit card account.

In another preferred embodiment of the invention, there is more than one child's account.

In another preferred embodiment of the invention, there is more than one parent's account.

In another preferred embodiment of the invention, both credit card accounts are assigned to the same person.

The many advantages of the present invention will become clear to those skilled in the art from the present disclosure. Among other advantages, the present invention offers the following advantages over existing methods:

The present invention allows a parent to provide supervised credit to a child.

The present invention allows a parent to receive a statement, including a child's expenses.

The present invention allows a parent to use the system to restrict the number of purchases made by the child.

The present invention allows a parent to make a single payment for their account and their children.

The present invention can be used as an educational tool to teach others how to wisely use credit and debit cards.

By providing for processing which maintains a constant total family credit limit, the present invention permits a parent to increase the child's available credit without the bank approvals normally required for an increase.

In the present invention, a parent's payment pays for a child's expenditures, but does not change a child's available credit. The child's available credit is only increased by a parent request.

The present invention is compatible with existing credit and debit card systems. The invention may be implemented by extending the operation of conventional systems, without requiring their replacement.

The present invention does not require changes to the physical computer hardware or merchant equipment in use for credit and debit card systems today.

These and other features and advantages of the present invention will become better understood with regard to the following description, claims and accompanying drawings.

DETAILED DESCRIPTION OF PREFERRED EMBODIMENTS

A preferred embodiment of the present invention provides a credit card system. More specifically, the present invention encompasses a credit card system that allows a limit to be set on the number of expenditures that can be made and allows the available credit to be determined by someone other than the card issuer. The system can be used to provide a mechanism for supervising credit or debit card usage.

Figure 1:
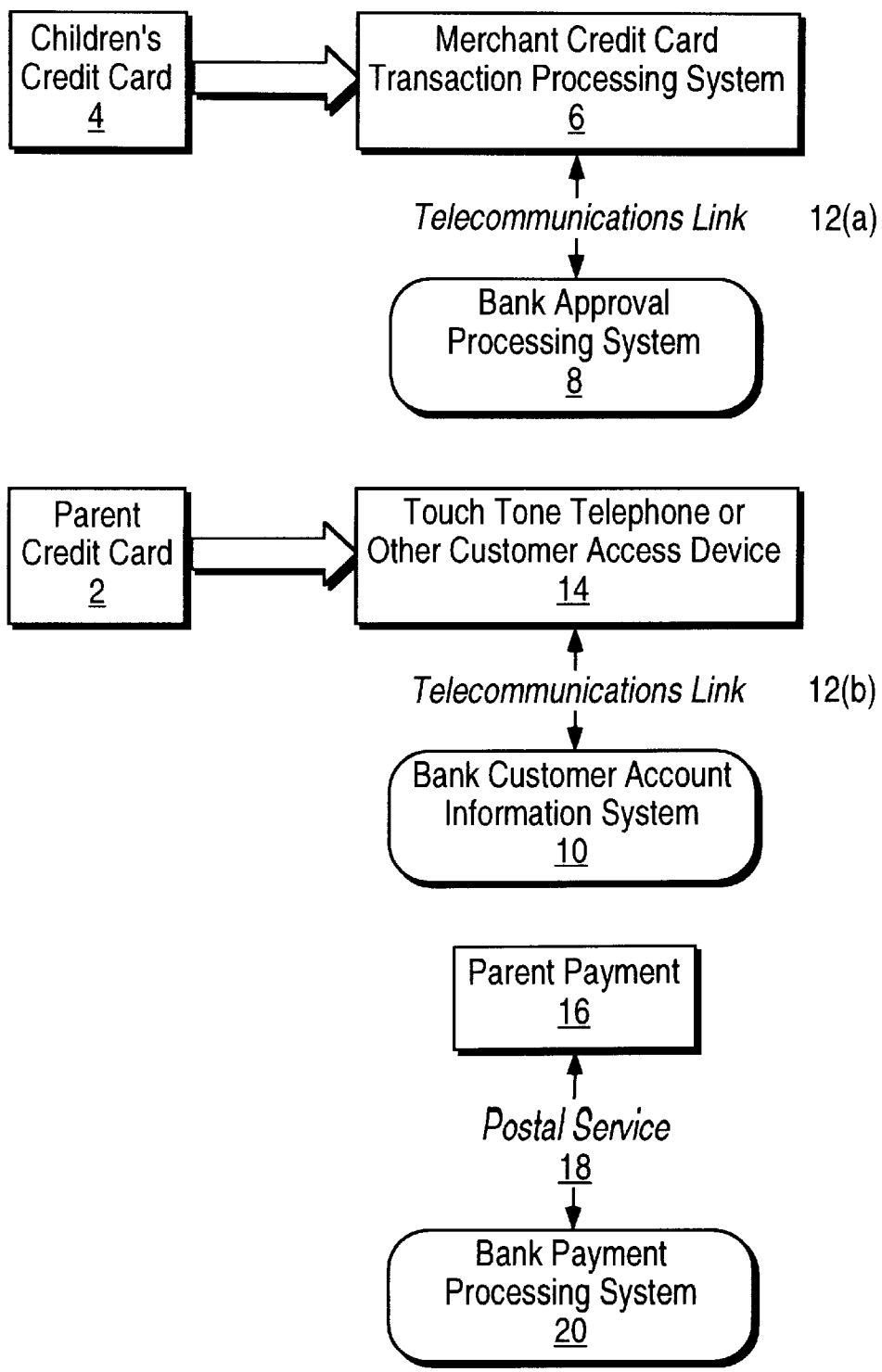
FIG. 1 shows an overview of a preferred embodiment of the present invention.

Referring to the overview in FIG. 1, the embodiment's high level components are:

A physical credit card for a parent 2 with an associated parent's account number;

A physical credit card for a child 4 with an associated child's account number;

A Merchant Credit Card Transaction Processing System 6;

A Bank Approval Processing System 8;

A Bank Customer Account Information System 10;

A telecommunications link 12(a) which interconnects the Merchant Credit Card Transaction Processing System and the Bank Approval Processing System;

A touch-tone telephone or other customer access device 14;

A telecommunications link 12(b) which interconnects the customer access device and the Bank Customer Account Information System;

A parent form of payment 16;

A payment delivery service 18, such as the U.S. Postal Service, which delivers the payment to the banks; and A Bank Payment Processing System 20.

The parent's physical credit card 2 is used by the parent to make purchases by presenting the card to a merchant. Similarly, the child's credit card 4 is used to make purchases by presenting the card to a merchant. The Merchant Credit Card Transaction Processing System 6 is used by the merchant to request approval for a customer's credit card expenditure. The Bank Approval Processing System 8 is used to approve credit card expenditure requests submitted by the Merchant Credit Card Transaction Processing System 6. To supervise a child's card, the parent uses a touch tone telephone or other customer access device 14 to enter requests which are processed by the Bank Customer Account Information System 10. A parent sends a payment 16 via the payment delivery service 18 which is processed by the Bank Payment Processing System 20.

The physical credit cards 2 and 4 for the parent and child are standard credit cards issued today. The embodiment also uses existing Merchant Credit Card Transaction Processing Systems 6. Existing telecommunications links 12(a) interconnect the Merchant Credit Card Transaction Processing System 6 to the Bank Approval Processing System 8. All bank systems use conventional computer and telecommunications equipment.

This invention operates by extending and modifying the currently existing software operations, including database operations, of statement processing, the Bank Approval Processing System 8, the Bank Customer Account Information System 10, and the Bank Payment Processing System 20.

Credit Cards

The parent and child each have separate credit cards 2 and 4 with distinct credit card numbers that represent credit card accounts. As in current systems each credit card account is assigned to an account holder. The names on the credit cards 2 and 4 normally are different and the mailing addresses may be different as well. Preferably, the child's credit card 4 expires at the same time as or before the parent's credit card 2, avoiding the possibility of an expired parent's card 2 linked to a valid child's card 4. Similarly, if a parent's credit card 2 is revoked due to a decision by the bank to discontinue credit, the child's credit card 4 should be revoked as well. The information on the cards' magnetic strip is the same as credit cards currently in use, and contains just one account number. Normally a credit card account is specified by an account number. However, it is possible to uniquely identify a credit card account using multiple attributes which may be provided on the credit card's magnetic strip. For example, both account number and name may be used to specify an individual credit card account. This invention includes the case where an individual account may be distinguished by both account number and person's name, or any other set of uniquely identifying attributes, such as a Social Security number.

In this invention, the loss or theft of a child's credit card 4 will not affect the parent's credit card 2. The child's account number is immediately canceled, without canceling the parent's account. The bank may then issue the child a new account number and credit card 4. If the parent's credit card 2 is lost or stolen, it is possible to provide processing which allows the child's card to remain functional. However, a preferred approach is to immediately create a new parent's account number and change the child's card to be associated with the new account.

Data Model

Figure 2:
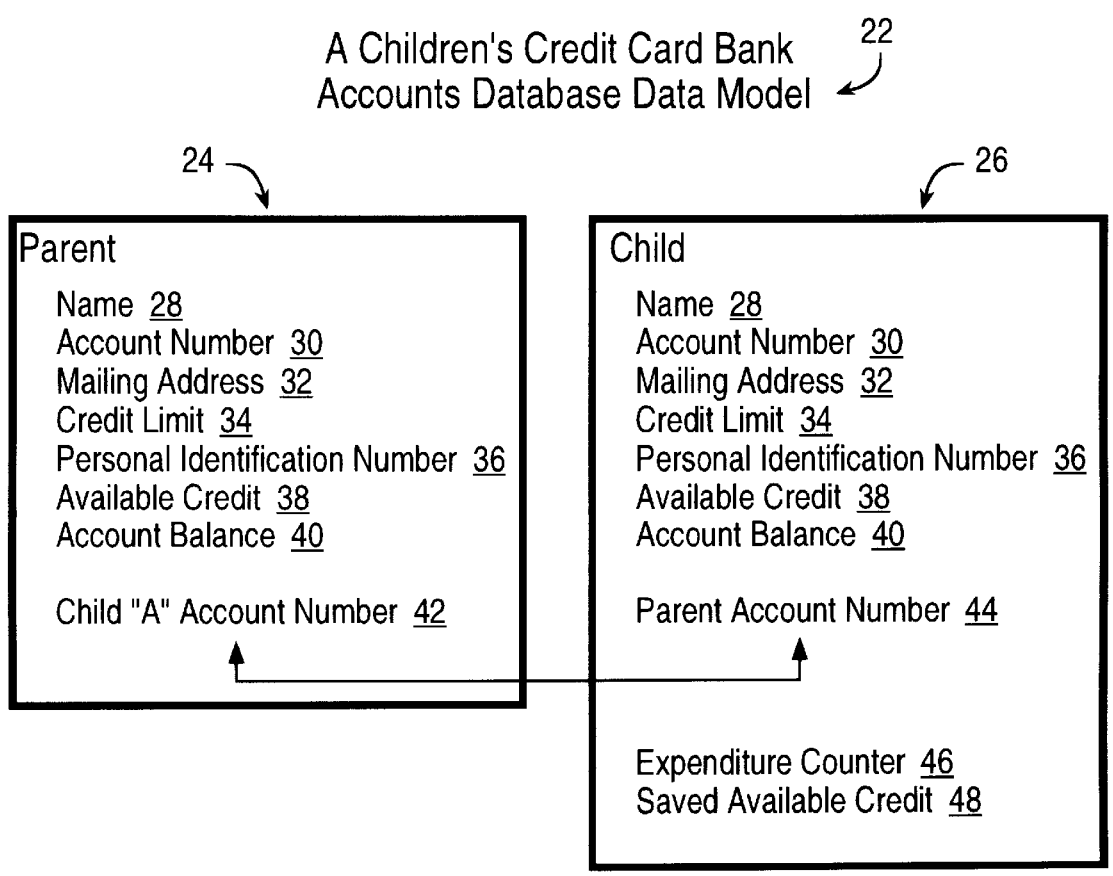
FIG. 2 shows the Bank Accounts Database data model for an embodiment of the present invention.

The issuer of a credit card, usually a bank, maintains a Bank Accounts Database 22 which includes information about each of the credit card accounts maintained at the bank. A data model of the Bank Accounts Database 22 in a preferred embodiment of the present invention is shown in FIG. 2. The actual database records used with this invention may be adapted to fit into current databases maintained at banks. Many alternate data models and database implementations of this invention are possible. The Bank Accounts Database 22 represented in FIGS. 2–11 may be a network of databases maintained on different computers at more than one location. This invention may be used with credit cards issued by merchants, phone companies, and other entities.

Two new database records are defined: a parent account record 24 and a child account record 26. The new records include the account number 30, account holder name 28, account holder mailing address 32, credit limit 34, account holder personal identification number (PIN) 36, account available credit 38, account balance 40, and any additional fields for information concerning the account that the bank wishes to keep. The account number 30, account holder name 28, and account holder mailing address 32 fields hold the account's identifying number and the name and address of the account holder. The Credit Limit Field 34 in the parent account record 24 holds the credit limit figure set by the bank for the parent's credit card account. In a preferred embodiment of the invention, a credit limit is not maintained with the child's account record 26. The PIN Code Field 36 in the parent's account record 24 is used to verify the PIN input by the parent during parent request processing. PIN codes can be encrypted in the database. A child's account optionally may have a PIN Code Field. The Available Credit Field 38 holds a figure representing the amount of credit currently available for use by the account holder. The child's available credit is maintained separately from the parent's available credit. The child's available credit is initially set to zero, but may be changed to a value specified by the parent at the time the child's account is created. In the parent account record, the Account Balance Field 40 holds the amount currently due for payment. An account balance 40 is also maintained within the child's account record.

In addition, the parent account record 24 includes the child's Account Number Field 42 to hold the associated child's credit account number. If there are additional child accounts, the additional account numbers also are included in the parent account record. Similarly the child account record includes a parent's Account Number Field 44 to hold the associated parent's credit account number. The child's account record also includes an Expenditure Counter Field 46 and a Saved Available Credit Field 48. The Expenditure Counter Field 46 contains an integer value indicating one of three modes:

less than 0 - - - the child's card is enabled with no limit on the number of approved expenditures;

equal to 0 - - - the child's card is disabled, and expenditures will not be approved until enabled by the parent; or greater than 0 - - - the child's card is enabled, but will approve only the number of expenditures equal to the counter value.

When the Expenditure Counter is equal to zero, the child's available credit is stored in the Saved Available Credit Field 48, and the Available Credit Field 38 is set to zero.

Figure 2A:
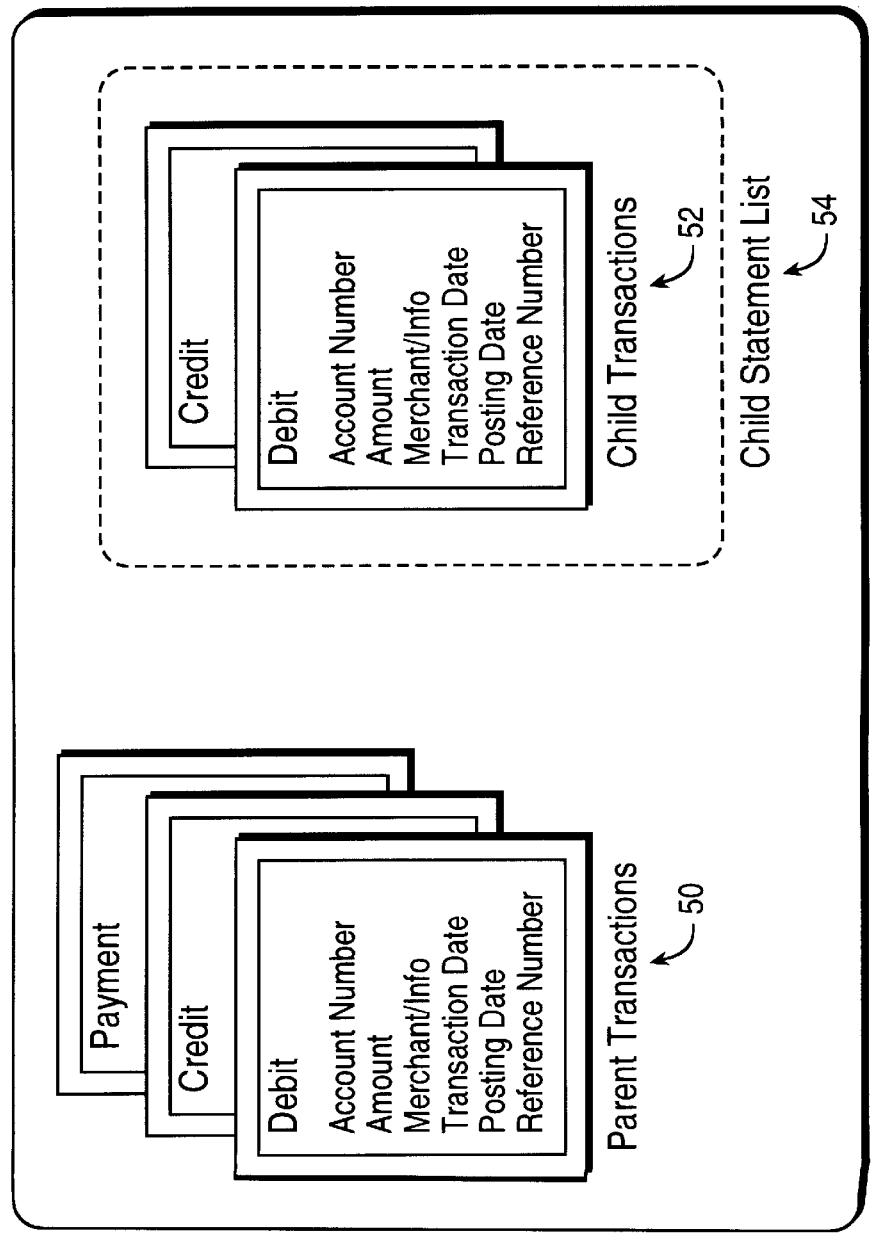
FIG. 2a shows the Parent Statement List in an embodiment of the present invention.

The data model 22 also includes records of credit card transactions, including debits, credits, payments, and other transactions. In FIG. 2a, debit transaction records 50 and 52 are shown. In a preferred embodiment of the invention, the data model and operations for transaction records are not changed from current credit card systems.

When a child makes an expenditure, a new debit transaction record 52 is created in the child's credit account. In a preferred embodiment of the invention, the data model does not require a separate debit transaction record for the expenditure to be included on the parent's credit account record. Database query processing can retrieve a list including both parent and child debit transaction records, avoiding the need to duplicate the child's debit transaction record. The database query uses the parent's account number to retrieve the child's account number from the parent's account record. Query processing can retrieve all transaction records corresponding to either the parent account number or the child account number. Another approach is to obtain the child account numbers by querying for all child account records linked to a given parent account.

FIG. 2a depicts a parent statement list 56 which is used to generate a monthly statement for the parent's credit card. The parent statement list 56 will include both parent and child transactions. This approach may be used for any number of children. In a preferred embodiment of the invention, the query processing described above is used to create a Parent Statement List 56. The child statement list 54 is defined to include only transactions made by the individual child. Similar to the parent statement list 56, a parent balance list includes both parent and child transactions used to compute the parent's account balance due. As in current systems, the parent's account balance due is used to compute interest charges and for customer inquiries.

Approval Processing

Figure 3:
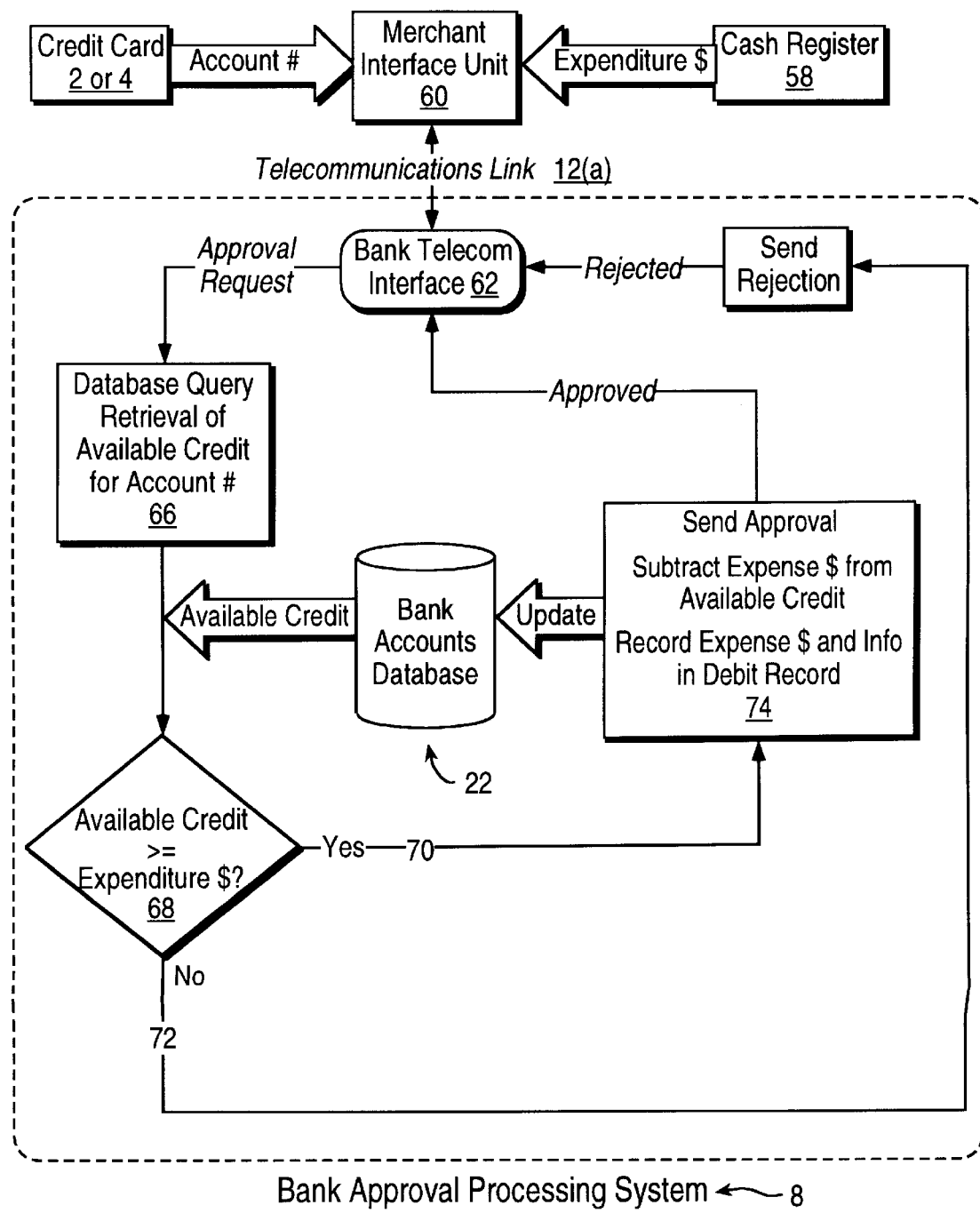
FIG. 3 shows a flow chart of the approval processing of a purchase made with either the parent's credit card or the child's credit card in an embodiment of the invention.

When a parent or child desires to make a purchase with his or her credit card, the request is submitted by the merchant and processed by the Bank Approval Processing System 8 to determine whether the purchase is approved. Although referred to as a Bank Approval Processing System, the system may be operated by an entity other than a Bank. The Bank Approval Processing System 8 is shown in FIG. 3.

When a customer makes a purchase using his credit card, the merchant uses a transaction processing system to request approval for the charge. Merchant credit card transaction processing systems vary widely in equipment and implementation. The invention is compatible with and does not require modifications to existing merchant systems. In FIG. 3, the Merchant Credit Card Transaction Processing System 6 is represented by a cash register 58 and a merchant interface unit 60. Other merchant systems may combine the two functions into one unit. Any type of merchant credit card transaction system currently in use may be used with the present invention. The cash register 58 provides the merchant interface unit 60 with the expenditure amount requested for approval. The customer's credit card 2 or 4 provides the credit card account number to the merchant interface unit 60. Typically the customer's account number is input by passing the card's magnetic strip through a reader built into the merchant interface unit 60.

The merchant interface unit 60 establishes a data connection to the bank telecommunications interface 62 through a telecommunications link 12(a). The merchant interface unit 60 transmits an approval request including credit card account number and expenditure amount. The bank telecommunications interface 62 receives the request for approval from the merchant interface unit 60 and returns a response indicating if the request is approved. The merchant interface unit 60 may then end the data connection to the bank.

The merchant interface unit 60 commonly includes instructions on how to automatically establish a data connection to the bank. Data identifying the merchant's account with the bank is also transmitted. The cash register 58 may provide descriptive information about the purchase in addition to the purchase amount.

As shown in FIG. 3, the Bank Approval Processing System 8 uses a central computer (not shown in FIG. 3) to operate as follows:

1. An approval request from the merchant interface unit 60 including credit card account number and expenditure amount is received by the Bank Approval Processing System 8;

2. A database query operation 66 is performed to retrieve the available credit for the given account from the Bank Accounts Database 22;

3. At decision step 68 the available credit for the account is compared to the expenditure amount;

4a. If the available credit is greater than or equal to the expenditure amount, branch 70 is followed and step 74 is performed. The expenditure is approved and an approval message is sent to the merchant interface unit 60. The Bank Accounts Database 22 is updated to record the expenditure approved, and the new available credit amount for the account is entered in the account Available Credit Field 38. The available credit is reduced by the expenditure amount. The expenditure is recorded by creating a new debit transaction record in the database.

4b. If the available credit is less than the expenditure amount, branch 72 is followed, the expenditure is not approved and a rejection message is sent to the merchant interface unit.

Approval Processing with Expenditure Limits

Figure 4:
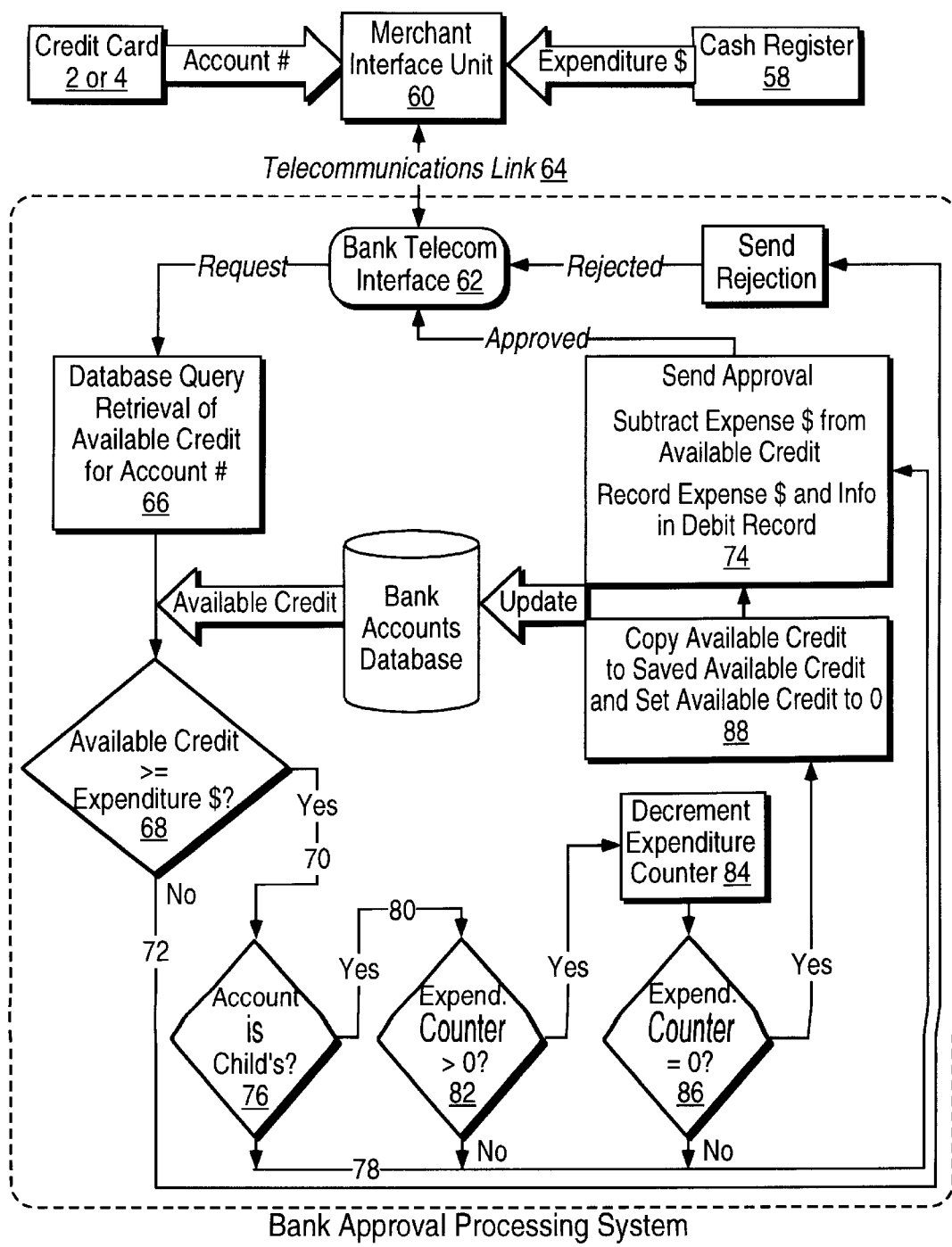
FIG. 4 shows a flow chart of the approval processing of a purchase made with a credit card with additional steps for expenditure limits processing in an embodiment of the invention.

The Bank Approval Processing System 8 may include approval processing with expenditure limits. Approval Processing with Expenditure Limits is shown in FIG. 4. FIG. 4 shows the additional steps taken on branch 70 either before or after step 74 when the system includes expenditure limits operations.

In approval processing with expenditure limits, if an expenditure is rejected due to lack of available credit, the processing is the same as in FIG. 3. As will be shown in FIG. 6, if a child's Expenditure Counter is equal to 0, the expenditure will always be rejected because the child's available credit will be 0.

If at decision step 68 the available credit is greater than or equal to the expenditure amount, additional processing 76 first checks if the approval request is for a parent's account or a child's account. For a parent's account, branch 78 is followed and there is no further additional processing for expenditure limits and processing proceeds as in FIG. 3. For a child's account, branch 80 is followed and at step 82 the value of the Expenditure Counter is obtained from the field in the child account record, as shown in FIG. 2. If the child's Expenditure Counter is less than 0, then the child's card is enabled with no limit to the number of approved expenditures. Then there is no further additional expenditure limit processing and processing proceeds as in FIG. 3. If the child's Expenditure Counter is greater than 0, at step 84 the Expenditure Counter is decremented by one in the Bank Account's Database 22. At step 86, the value of the Expenditure Counter is obtained. If the Expenditure Counter is now equal to zero, at step 88 the value in the Available Credit Field is stored in the Saved Available Credit Field of the child account record, and the Available Credit Field of the child account record is set to 0. With zero available credit, any subsequent expenditures will not be approved. After step 88 processing proceeds as in FIG. 3.

Credit Processing

Figure 5:
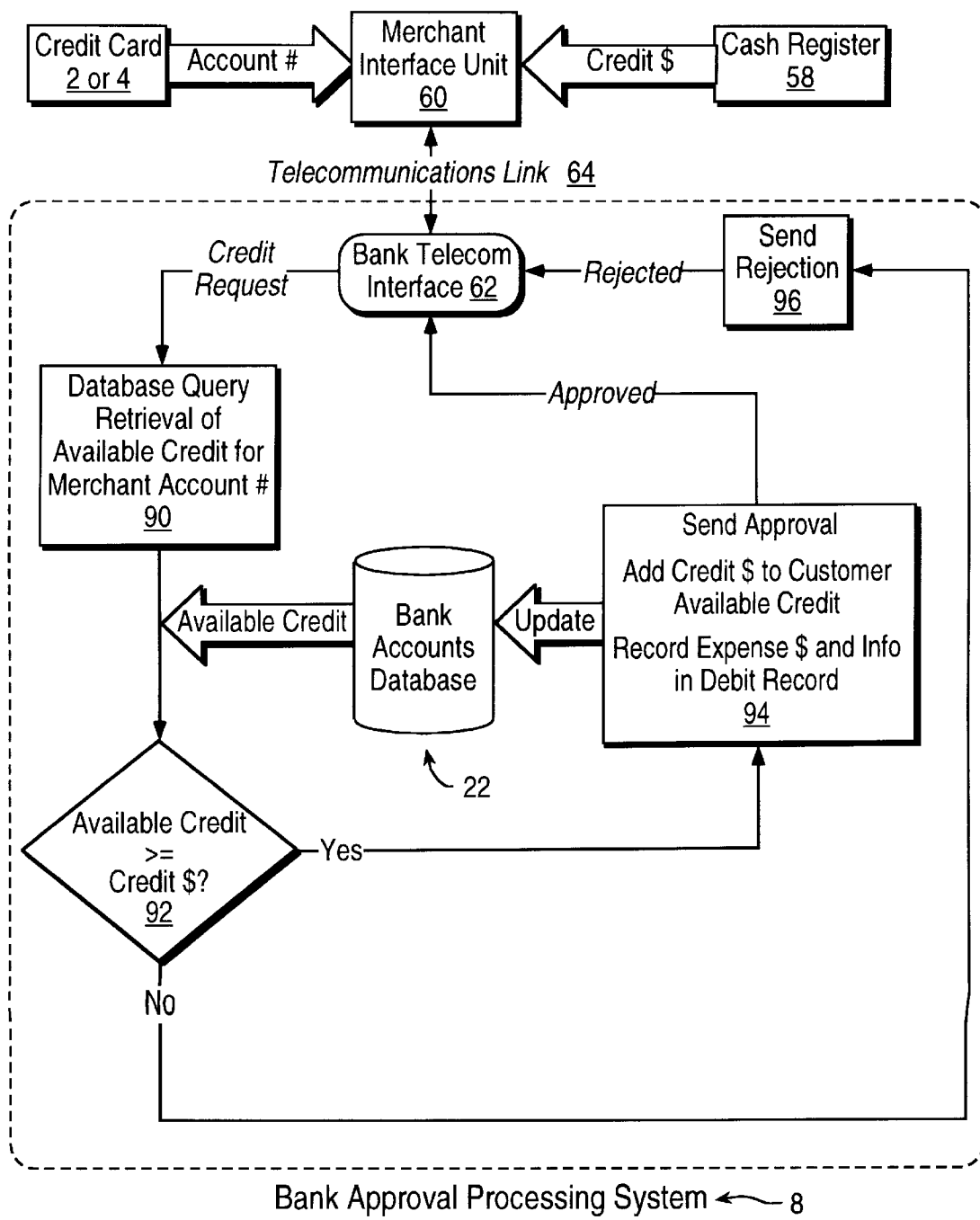
FIG. 5 shows a flow chart of the processing of a credit to a credit card account in an embodiment of the invention.

Credit Processing is shown in FIG. 5. The system is similar to the approval processing shown in FIG. 3. When a merchant desires to give a credit to a parent or child, the request is submitted by the merchant and processed by the Bank Approval Processing System 8. The cash register 58 provides the merchant interface unit 60 with the credit amount. The customer's credit card 2 or 4 provides the credit card account number to the merchant interface unit 60. The telecommunications link 64 establishes a data connection between the merchant interface unit 60 and the bank telecommunications interface 62.

As shown in FIG. 5, the Bank Approval Processing System 8 operates as follows:

1. A credit request from the merchant interface unit 60 including merchant account number, credit card account number and credit amount is received by the Bank Approval Processing System 8.
2. A data base query operation 90 is performed to retrieve the available credit for the merchant account from the Bank Accounts Database 22.
3. At decision step 92 the merchant's available credit is compared to the requested amount.
4a. If the merchant's available credit is greater than or equal to the requested credit, then at step 94 the Bank Accounts Database 22 is updated to record the credit approved and the new available credit amount for the customer's account. The available credit for the customer is increased by the credit amount. The credit is recorded by creating a new credit transaction record in the database. The approval message is sent to the merchant interface unit.
4b. If the merchant's available credit is less than the requested amount, the credit is not approved and at step 96 a rejection message is sent to the merchant interface unit 60 through the telecommunications link 64.

Parent Request

Parent requests facilitate the supervision of the child's credit card and include increases in a child's available credit, decreases in a child's available credit, enabling and disabling a child's credit card, and controlling the number of expenditures allowed to be made with the child's card.

Figure 6:
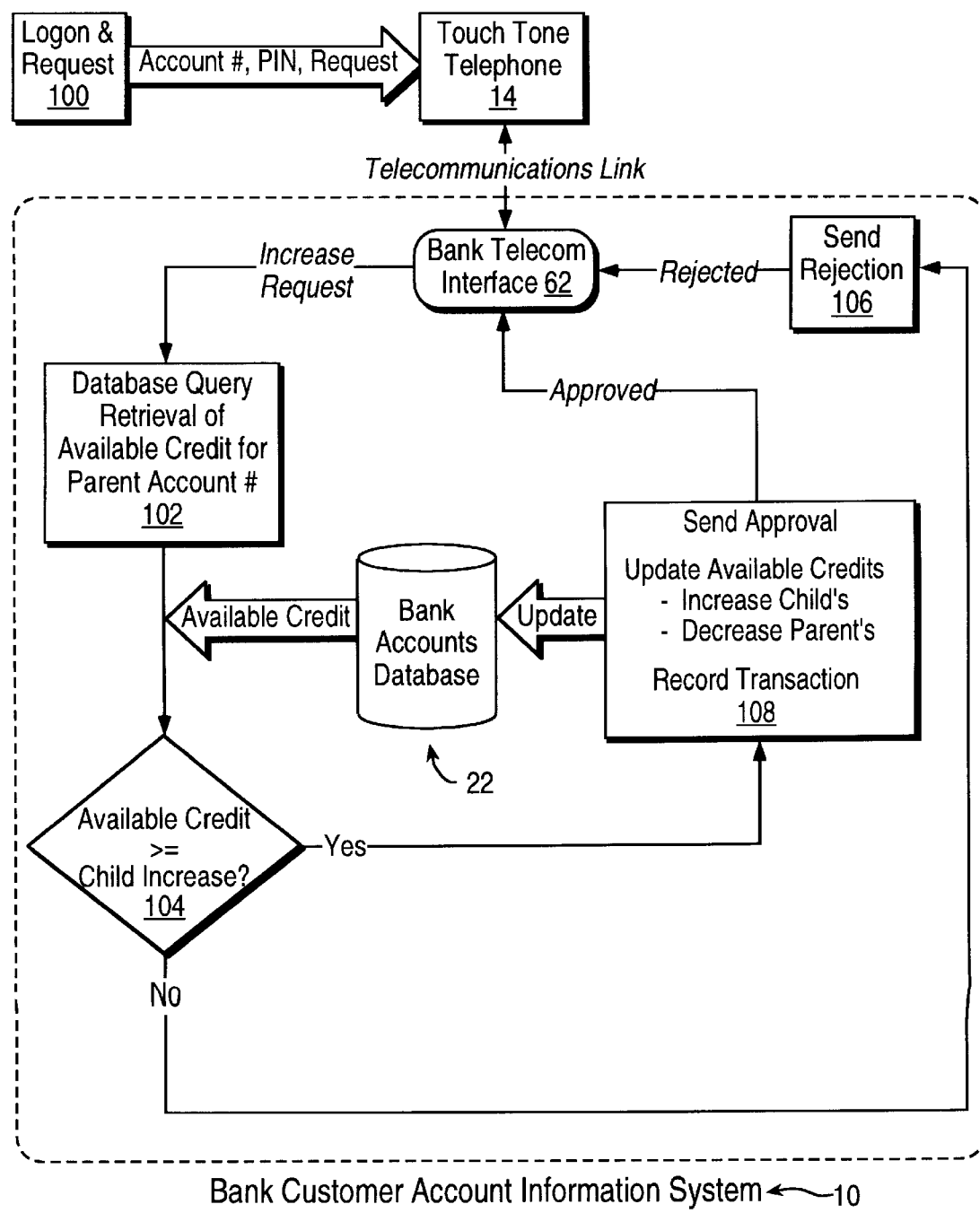
FIG. 6 shows a flow chart of the processing of a parent request for an increase in the child's available credit in an embodiment of the invention.

The processing for a parent request to increase a child's available credit is shown in FIG. 6. The operations are described for a teleprocessing based Bank Customer Account Information System 10. Teleprocessing based systems are common in the banking industry today, allowing a customer to retrieve account information and make requests using a touch tone telephone. Other systems that allow the customer to input and receive information, automated teller machines and personal computer systems, also may be used in this invention. The basic operations are independent of the form of customer access.

The parent uses a touch-tone telephone 14 to dial the telephone number for the Bank's Customer Account Information System 10, logs on by entering the parent account number and PIN, enters the request to increase the child's available credit by choosing a number from a menu, and enters the amount of the increase. The Bank Customer Account Information System 10 uses the telecommunications link 12(*b*) to answer the parent's incoming call, guides the parent through the log on process for that particular bank's Bank Customer Account Information System 10. Then a menu of request choices is played to the customer by the Bank Telecom Interface 62. For example, "To increase a child's available credit, press 1, to decrease a child's available credit, press 2," etc. Processing of a parent request to increase a child's available credit proceeds as follows:

1. As a part of the log on and request 100, the parent provides his or her account number, which is used to retrieve the parent's account record from the Bank Accounts Database 22. The parent account record 24 includes the child's account number, as shown in FIG. 2. Using the child's account number, the child's account record 26 may be retrieved from the Bank Accounts Database 22. If a parent has more than one child with a card, the parent also will be prompted by the Bank Telecom Interface 62 to select the child to which the request applies. The Bank Customer Account Information System 10 prompts the parent to enter the amount of the increase requested in the child's available credit. The Bank Telecom Interface 62 receives the amount entered.
2. The Bank Customer Account Information System 10 performs a database query operation 102 to retrieve the available credit for the parent's account from the Bank Accounts Database.
3. At decision step 104 the available credit for the parent's account is compared with the requested increase.
4a. If the parent's available credit is less than the requested increase in the child's available credit, at step 106 the request is not approved and a rejection message is sent to the customer who hears it over the telephone.
4b. If the parent's available credit is greater than or equal to the requested increase in the child's available credit, at step 108 the request is approved and an approval message is sent to the customer who hears it over the telephone.

Also at step 108, the Bank Accounts Database 22 is then updated to record the transaction and to update the available credit amounts. The child's available credit is increased by the requested amount and the parent's available credit is decreased by the same amount.

Figure 7:
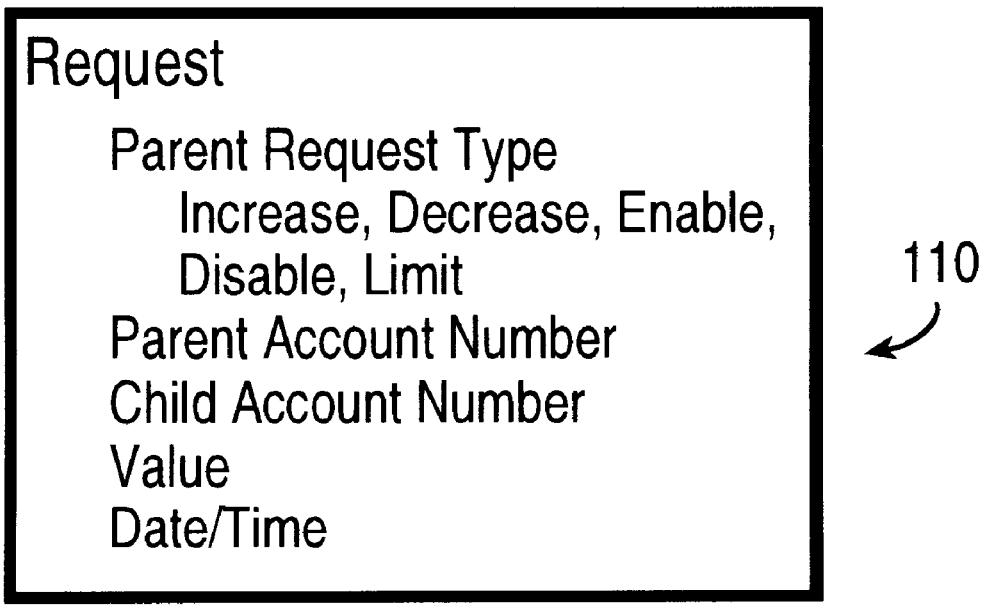
FIG. 7 shows the data model for a Parent Request Transaction Record in an embodiment of the invention.

As shown in FIG. 7, the completed parent request is recorded by creating a new parent request transaction record 110 in the Bank Accounts Database 22. The parent request transaction record includes the parent account number, the child account number, the amount of the increase in the child's available credit, and the date and time of the transaction.

This invention may incorporate additional processing to optionally allow security limits on increases in a child's available credit. A security limit value may be stored in the child account record's Credit Limit Field 34. The processing of a requested increase to the child's available credit would include a step to compare the child increase to the security limit value before or after decision step 104.

If a parent requests a change in the child's available credit when the child's card is disabled, the parent's request is rejected.

Parent Decrease Request

Figure 8:
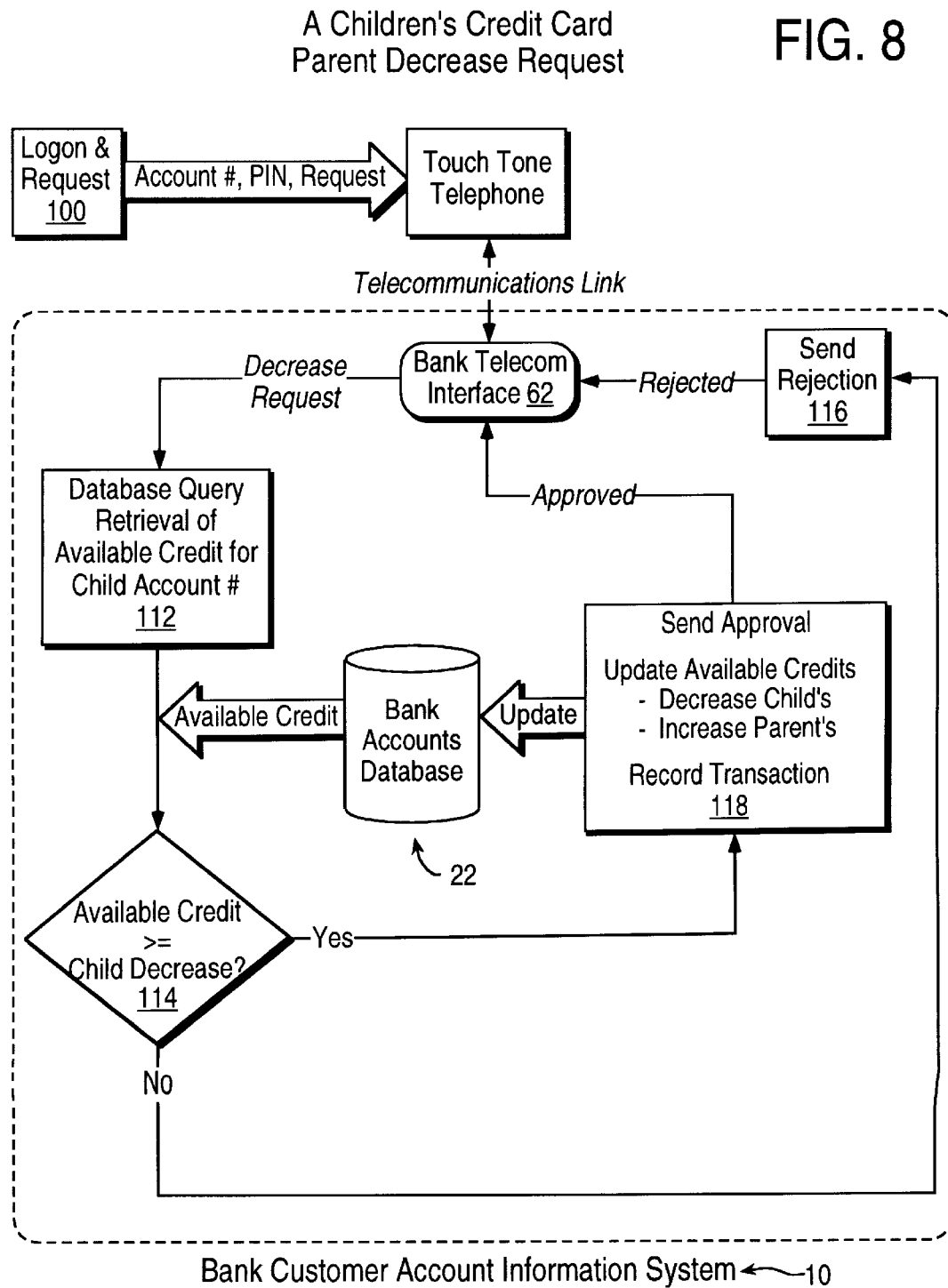
FIG. 8 shows a flow chart of the processing of a parent request for a decrease in a child's available credit in an embodiment of the invention.

A parent may also request a decrease in the child's available credit. The processing for a parent request to decrease a child's available credit is shown in FIG. 8. This processing uses the same log on and request step as step 1 for the parent increase request, but the parent requests a decrease rather than an increase in the child's available credit. Processing of a parent request to decrease a child's available credit proceeds as follows:

2. The Bank Customer Account Information System 10 performs a database query operation 112 to retrieve the available credit for the child's account from the Bank Accounts Database 22.

3. At decision step 114 the available credit for the child's account is compared with the requested decrease.

4a. If the child's available credit is less than the requested decrease in the child's available credit, at step 116 the request is not approved and a rejection message is sent to the parent who hears it over the telephone.

4b. If the child's available credit is greater than or equal to the requested decrease in the child's available credit, at step 118 the request is approved and an approval message is sent to the parent who hears it over the telephone. Also at step 118 the Bank Accounts Database is then updated to record the transaction and to update the available credit amounts. The child's available credit is decreased by the requested amount and the parent's available credit is increased by the same amount.

Parent Disable Request

Figure 9:
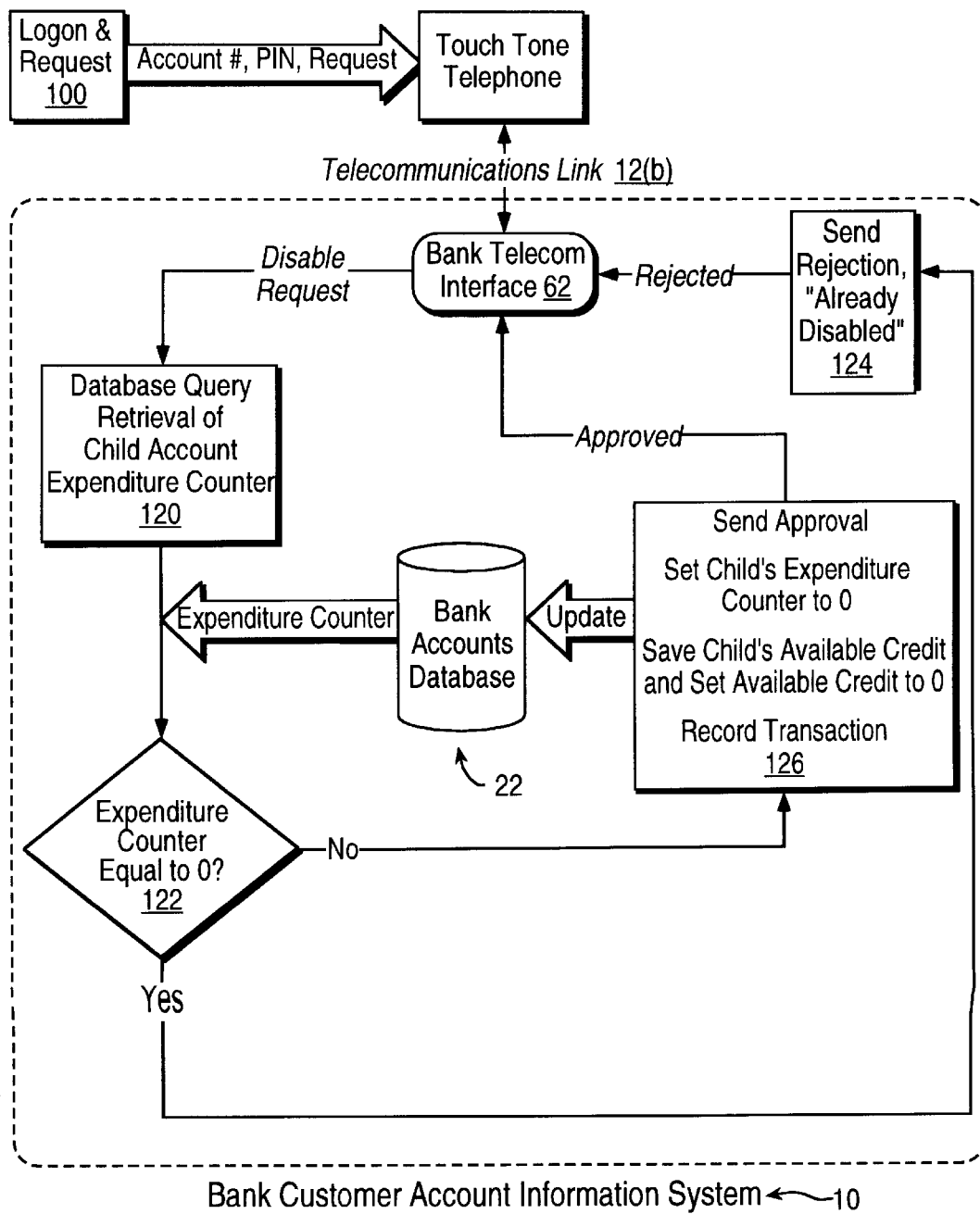
FIG. 9 shows a flow chart of the processing of a disable request by the parent in an embodiment of the invention.

The processing for a Parent Disable Request is shown in FIG. 9. The parent follows the procedure described in step 100 above for a Parent Increase Request to gain access to the Bank Customer Account Information System 10. When prompted by the Bank Telecom Interface 62 to select a request, the parent makes a request to disable the child's credit card. A database query 120 is performed to retrieve the child's account record Expenditure Counter Field 46. At decision step 122, if the Expenditure Counter is already equal to zero, the child's account is already disabled. At step 124, a rejection message is sent to the parent over the telecommunications link 12(*b*) indicating that the child's card is already disabled. If the Expenditure Counter is not equal to zero, at step 126 the parent's request is approved. Also at step 126 the child's Expenditure Counter is then set to zero, the child's available credit value is stored in the Saved Available Credit Field 48 of the child account record 26, the Available Credit Field 38 in the child's account record 26 is then set to zero, and the Bank Accounts Database 22 is updated to record the transaction and to update the new values in the child's account record 26.

Parent Enable Request

Figure 10:
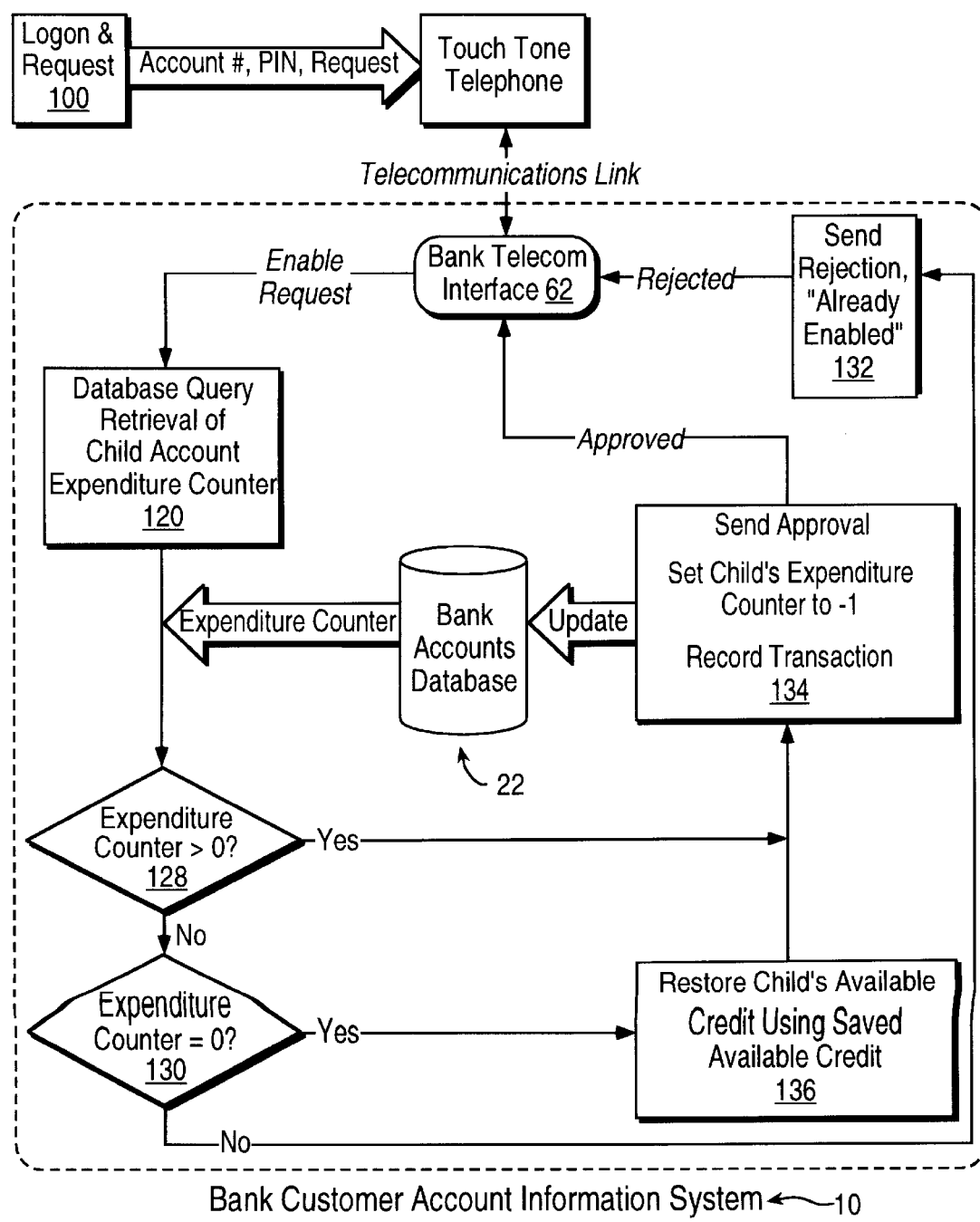
FIG. 10 shows a flow chart of the processing of an enable request by the parent in an embodiment of the invention.

The processing for a Parent Enable Request is shown in FIG. 10. The parent follows the procedure described in step 100 above for a Parent Increase Request to gain access to the Bank Customer Account Information System 10. When prompted by the Bank Telecom Interface 62 to select a request, the parent makes a request to enable the child's credit card. A database query 120 is performed to retrieve the child account record Expenditure Counter Field 46. If the Expenditure Counter is not greater than (at decision step 128) or equal to (at decision step 130) zero, the child's account is already enabled. At step 132 the parent's request is rejected with an indication that the account is already enabled. If at decision step 130 the Expenditure Counter is equal to zero, the value from the Saved Available Credit Field of the child account record is copied to the Available Credit Field at step 136. If the Expenditure Counter is greater than or equal to zero, at step 134 the parent's request is approved. Also at step 134 the child's Expenditure Counter is set to minus one and the Bank Accounts Database 22 is updated to record the transaction and to update the new values in the child's account record.

Parent Limit Request

Figure 11:
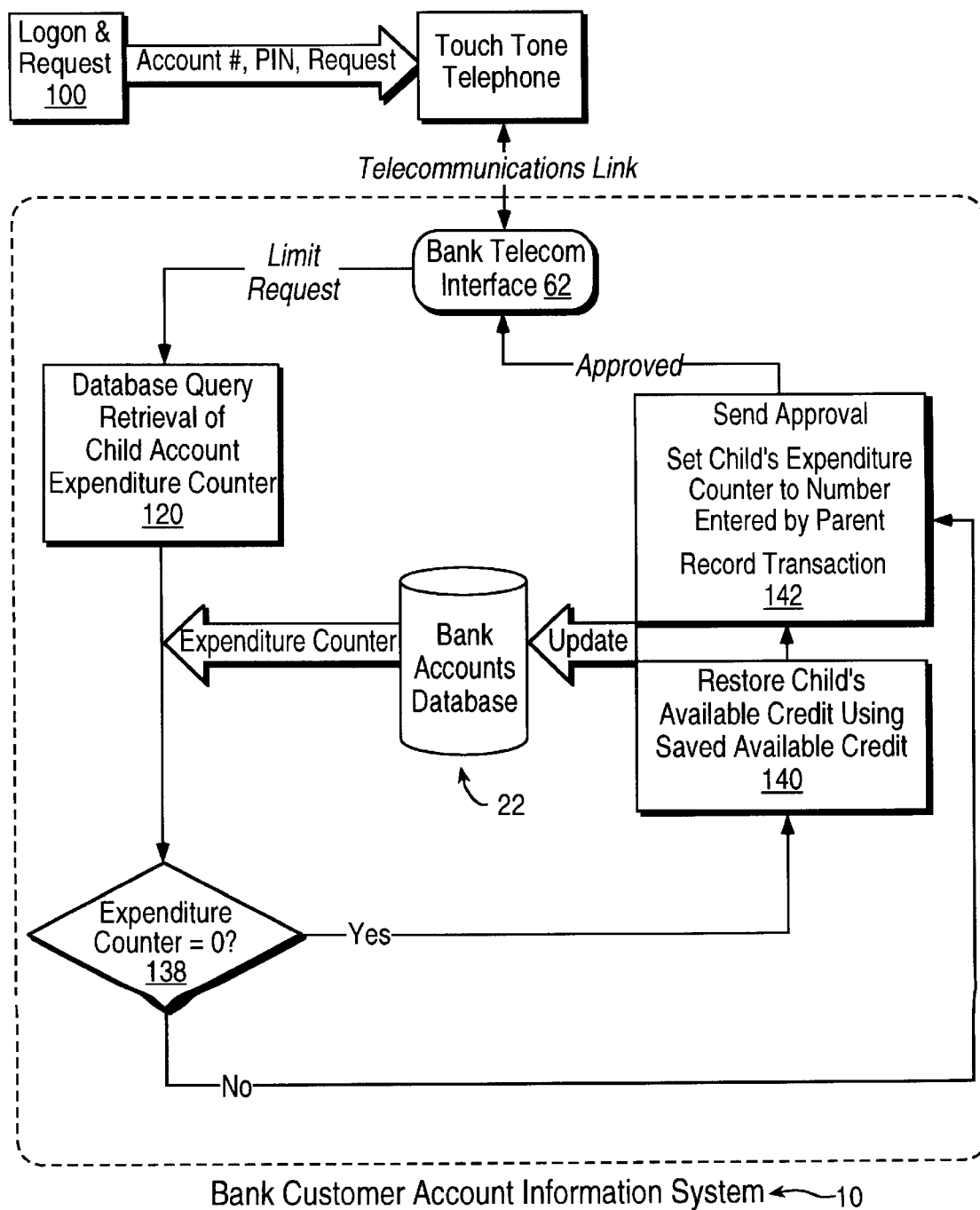
FIG. 11 shows a flow chart of the processing of an expenditure limit request by the parent in an embodiment of the invention.

The processing for a Parent Limit Request is shown in FIG. 11. The parent follows the procedure described in step 100 above for a Parent Increase Request to gain access to the Bank Customer Account Information System 10. When prompted by the Bank Telecom Interface 62 to select a request, the parent makes a request to limit the number of expenditures which may be made with the child's card. A database query 120 is performed to retrieve the child account record Expenditure Counter Field 46. At decision step 138 if the Expenditure Counter is equal to zero this indicates the child's account is disabled. In a preferred embodiment of the invention, the child account is re-enabled by the parent limit request, so at step 140 the child's available credit is restored using the value in the Saved Available Credit Field 48. For any current value of the Expenditure Counter (Expenditure Counter=0 or Expenditure Counter≠0) at step 142 the Expenditure Counter is set to a number entered by the parent. The parent limit request transaction is recorded in the database together with the updated child account record and the customer receives an indication that their request has been approved.

Payment Processing

Payments are processed in a preferred embodiment of the present invention as in current credit card systems. However, in a preferred embodiment of the invention, the statement printed by the bank and sent to the parent includes both parent and child transactions as in FIG. 2*a*.

In a preferred embodiment of the present invention, a parent's payment increases the parent's available credit but does not change a child's available credit. The child's available credit is increased only by a parent request or a child payment, see below.

If a parent does not make a complete payment, interest charges will accrue on the unpaid portion as in current systems. This invention incorporates processing such that interest charges do not accrue against the child's account. Note the child's charges are a part of the parent's balance due and will result in interest charges to the parent's account, if appropriate.

Practice Payments, statements and interest processing provides for a child's statement detailing the child's expenditures. When a child makes a payment to the child's account, this will increase the child's available credit. The invention provides processing such that a child payment will also be credited to the parent's account balance without increasing the parent's available credit. This is done by providing a Parent Account Balance List that includes both parent payments and child payments. This invention provides for optional processing which provides for practice interest charges on a child's practice statement. Practice interest is intended for educational purposes only, not payment.

Parent Debit Card

A debit card functions very much like a credit card. However, a debit account is based primarily upon funds deposited in the debit card account, rather than credit granted by a card issuer to a credit card account. The available credit for a debit card account then corresponds to the available account balance in the debit card account. While the term "available balance" can be used with debit cards, we will continue to use the term "available credit" for debit cards as well as credit cards, to avoid repetition.

When a parent's card is a debit card and the child's card is a credit card, this invention uses the same methods previously described to provide supervised credit to the child. The invention uses the parent debit card's available credit in the same way as previously described for the parent credit card's available credit. As in FIG. 6 when a parent requests an increase in a child's available credit, the parent's "available credit" is checked to see that a sufficient amount is present for the increase request. If yes, the child's available credit is increased by the requested amount, the parent's "available credit" is reduced by the same amount, and a transaction record is created in the Bank Accounts Database. However, the parent's Account Balance is not changed by an increase or decrease request in a child's available credit. Since interest earnings and bank service charges are based on the Account Balance, rather than the "available credit," a parent will earn interest for the entire balance even though the child has received available credit.

Debit card approval processing uses the same operations as shown in FIG. 3, except the expenditure amount is checked against the figure in the account's Available Credit Field. Also the expenditure amount is subtracted from the account's available balance.

When the parent's card is a debit card, parent requests to enable, disable, or set limits on the child card operate the same as described for a parent credit card.

Child Debit Card

When the child's card is a debit card, the child account record used in a preferred embodiment of the invention is shown in FIG. 2 without the Credit Limit Field 34. The Available Credit Field 38 is in effect an Available Balance Field. When there are no parent disable or limit requests, the child account operates as a normal debit card account. Debit card approval processing uses the same operations as shown in FIGS. 3 and 4. Parent requests to enable, disable, or set limits on the child debit card operate the same as described for a child credit card. A parent's statement includes a child's debit card transactions through the same operations as for a child's credit card.

Transaction Record Lists for Credit Cards

The processing of transaction records is summarized. These lists may be implemented by using database query operations to select a given list of transactions for specified accounts from the Bank Accounts Database. The child account may be determined from the parent's account number as described above.

For a Parent Credit Card:

Parent Statement List—includes parent and child debit expenditures, parent and child credits, parent and child payments, parent requests including increase, decrease, enable, disable, and limit requests, as well as any service charges, interest, or fees for the parent and child. Note the parent statement includes child purchases. Transactions on this list are shown on a parent's account statement.

Parent Account Balance List—includes parent and child debit expenditures, parent and child credits, parent and child payments and any service charges, interest charges, or fees for the parent and child. Transactions on this list are used to compute the parent account balance. The parent account balance is also used to compute interest charges for a credit card. Note a child payment increases the parent's account balance while a child debit decreases the parent's account balance.

Parent Available Credit List—includes parent debits, credits, and payments, parent increase/decrease requests and any service charges or fees for the parent and child. While the parent's available credit is maintained in the parent account record, it may be recomputed or verified using these transactions. Note a child payment does not affect the parent's available credit.

For a Child Credit Card:

Child Statement List—includes child debit expenditures, child credits, child payments, parent requests including increase, decrease, enable, disable, and limit requests. "Practice Interest" charges may also be shown.

Child Account Balance List—includes child debit expenditures, child credits, child payments. In a preferred implementation, any service charges, interest charges, or fees for the child are not included. A child's account balance list may be used to compute a child's account balance due. This balance due may be used by the child to determine the amount of a practice payment. An unpaid balance due may be used to compute practice interest for the child. For simplicity, an embodiment of the invention does not include practice interest in the child's balance due. For a child not using practice payments, the account balance due is largely for informational purposes, since the parent will make the payment. In this case, the account balance due may be shown on the child's statement just for the single statement period, rather than carrying a cumulative balance due forward.

Child Available Credit List—includes child debits, credits, and payments, and parent increase/decrease requests. While the child's available credit is maintained in the child account record, it may be recomputed or verified using these transactions. Note a parent payment does not affect the child's available credit.

Transaction Record Lists for Debit Cards

For a Parent Debit Card and Child Credit Card:

Parent Statement List—is the same as for a parent credit card, except interest may be earned rather than charged. Also, debit account deposits and withdrawals are shown instead of payments.

Parent Account Balance List—is the same as for a credit card, except interest may be earned rather than charged. Also, parent debit account deposits and withdrawals are shown instead of parent payments. The parent's account balance is used to compute interest earnings for the parent debit account.

Parent Available Balance List—includes parent debits, credits, deposits and withdrawals, parent increase or decrease requests and any service charges or fees for the parent. Note a child payment does not affect the parent available balance.

Allowances

Allowances are a common way parents help children learn about money and personal finances. Allowances may be provided by a parent regularly requesting an increase in a child's available credit in the amount of the child's allowance. These requests may be automated at the request of the parent. The Bank Customer Account Information System 10 menu may be extended to offer support for automating allowances. This would be done by extending the parent request menu to include an additional choice for allowances. When the parent selected allowances, they would be prompted by the Bank Telecom Interface 62 to enter the allowance amount and the periodic interval of the allowance, such as weekly. A parent would also be provided options to change or terminate an allowance previously entered.

Cards without Customer Known Credit Limits

For cards without customer known credit limits, when a parent increase request is made, the requested amount is checked against a bank known available credit value for the card, in the same manner as an expenditure approval request for this card would be checked. In general, processing follows the diagrams in FIG. 3 and FIG. 6. except that the available credit value is hidden from the customer. The available credit value may vary and may even be computed when required.

The invention generally does require a credit limit for the child's card, so a child's card without a customer known credit limit operates as described for a child's credit card.

Revolving Charge Cards

Cards requiring their balance be paid in full when due are fully supported by this invention. The invention uses the same systems and methods as with credit cards. Note that, as for credit cards, modifications to the Bank Approval Processing System 8 used with Revolving Charge Cards may be required. Also, in this case the Bank Approval Processing System 8 may be operated by the merchant, rather than a banking institution.

Cardless Transactions

For simplicity, we have described the invention for the case when a physical credit card is presented to a merchant. In general, a physical credit card is not required. For example, with mail order or telephone order purchases. Also, purchases may be made by entering credit card information using a personal computer or other remote interface not requiring a physical credit card. This invention is fully compatible with these and other transactions not requiring a physical credit card.

Future Forms of Payment

New forms of credit cards, "Smart Cards", and new forms of payment including electronic payments are known in current art today. This invention is fully compatible with all account based credit, debit, and payment systems.

Self Supervision—Single Account

It is possible to implement a self supervised card which allows the account holder to supervise their own credit or debit card, with all the capabilities of this invention. For example, an account holder could disable their own credit card and later re-enable it. The operations of enabling, disabling, and setting limits to a card are directly supported in the case of self supervision as described previously. Parent increase and decrease requests are also supported by extending the child's account record in the data model to add a Parent Available Credit Field. The Parent Available Credit Field would then be referenced instead of the parent account record Available Credit Field 38 in the parent increase or decrease request processing.

Unauthorized Use

It is possible to extend the approval processing shown in FIG. 4 to provide notification to the parent when an attempt is made to use a disabled credit card. This notification may be useful when a single individual supervises a second "child" credit card for their own use in less secure environments, such as public networks.

Support For More Than One Child

In another preferred embodiment of the present invention, more than one child has a credit card account or a debit card account linked with the parent's account. Processing is achieved by repeating the invention's processing for each child's card. If a parent's credit card account is linked with more than one child's credit card account, all child accounts will be listed in the parent's credit card account record 24. During a parent request, the parent is prompted by the Bank Customer Account Information System 10 to select a child account. The Parent Statement List 56 will include expenditure and other transaction information for each child whose account is linked to the parent's account. As described above, the linked child accounts may be retrieved using a query with the parent account's number, rather than by including all the child account numbers in the parent account record 24.

Support For More Than One Parent Account

In another preferred embodiment of the present invention, one or more child credit or debit card accounts are linked with multiple parent accounts. In this case, it is convenient to have one parent account designated as a "primary" account whose account number is used in the child account record Parent Account Number field 44. The primary parent account will receive copies of the child's transactions on their statement and pay for the child's expenditures, while all parent account(s) will be able to make parent requests including: increase the child's Available Credit, enable/disable the child's card, and set expenditure limits for the child's card. It is also possible to include child transactions on statements for all parent accounts linked to the child.

Family Available Credit

An alternate embodiment of this invention may be implemented by defining a family available credit which is separate from the parent account's available credit. The family available credit is stored in the Bank Accounts database separately from the parent's available credit. This alternate embodiment uses the family available credit in place of the parent's available credit for operations granting available credit to the child's account and operates, with this substitution, in the same way as previously described. Thus the parent request for approval processing shown in FIG. 6 may be generalized to retrieve the associated available credit figure, parent available credit or family available credit, and then compare the amount of the requested increase with the available credit figure.

The children's card system provides all the buyer benefits of a traditional credit card. With a simple telephone call, a parent can easily provide for large expenditures by a child. Another important benefit is the ability of a parent to provide purchasing power to the child anytime and anywhere, without requiring bank approval. For example, a parent at work can easily arrange for the child to buy lunch with the supervised credit card.

The children's credit card system is used for purchases in exactly the same way as other credit cards. In addition, the credit card may be used as an education tool. Under a parent's supervision, the child can learn to use a credit card wisely. The children's card facilitates learning through "practice credit card statements" and even "practice payments" and "practice interest". Unfortunately today, when young adults receive their first credit card they often have little experience or guidance with using a credit card wisely. The children's card also provides for allowances, a common way parents help children learn about money and personal finances.

The children's credit card system is compatible with existing credit card systems. The physical credit cards, credit card magnetic strips, merchant credit card equipment, and credit card approval telecommunication systems do not require changes in order to implement this invention. This is particularly important due to the large quantity of merchant equipment in place throughout the world today. An invention requiring changes to merchant equipment would be very difficult and slow to deploy. The invention is also compatible with debit cards and other forms of payment including electronic payments.

While the present invention has been described in connection with certain preferred embodiments, the present invention is not limited to such embodiments. Rather, the scope of the invention is defined by the claims.

What is claimed is:

1. A computer-implemented method of supervising credit or debit card account usage by selectively altering available credit, comprising the steps of:
   a) providing at least one first credit card account remotely disposed from at least one first credit card, wherein the first credit card account is issued by an account issuer to a first account holder and has an associated available credit figure;
   b) providing at least one second credit or debit card account, remotely disposed from at least one second credit card, wherein the second credit or debit card account is issued to a second account holder and has an associated available credit figure, the at least one first credit card account and the at least one second credit or debit card account being concurrently usable;
   c) receiving a request from a requestor to increase the available credit figure associated with the first account;
   d) determining whether the request to change the available credit figure associated with the first account will be approved by comparing the amount of the request with a figure established by the account issuer, wherein the figure established by the account issuer is the available credit figure associated with the second account; and
   e) if the amount of the request is less than or equal to the available credit figure associated with the second account, approving the request, wherein approving the request comprises:
      e.1) increasing the available credit figure associated with the first account by the amount of the request, and
      e.2) decreasing the available credit figure associated with the second account by the amount of the request.

2. A computer-implemented method of allowing supervised credit or debit card usage by selectively altering available credit, comprising the steps of:
   a) providing at least one first credit card account, wherein the first credit card account is issued by an account issuer to a first account holder and has an associated available credit figure;
   b) providing at least one second credit or debit card account, remotely disposed from the at least one second credit card, wherein the second credit or debit card account is issued to second account holder and has an associated available credit figure, the at least one first credit card account and the at least one second credit or debit card account being concurrently usable;
   c) receiving a request from a requestor to change the available credit figure associated with the first account, wherein the request to change the available credit figure is a request to increase the available credit figure associated with the first account;
   d) providing a total available credit figure associated with the first and second accounts;
   e) determining whether the request to change the available credit figure associated with the first account will be approved by comparing the amount of the request with a figure established by the account issuer, wherein the figure established by the account issuer is the total available credit figure; and
   f) if the amount of the request is less than or equal to the figure established by the account issuer, approving the request, wherein approving the request comprises:
      f.1) increasing the available credit figure associated with the first account by the amount of the request, and
      f.2) decreasing the available credit figure associated with the second account by the amount of the request.

3. A computer-implemented method of allowing supervised credit or debit card usage by selectively altering available credit, comprising the steps of:
   a) providing at least one first credit card account, wherein the first credit card account is issued by an account issuer to a first account holder and has an associated available credit figure;
   b) providing at least one second credit or debit card account, remotely disposed from the at least one second credit card, wherein the second credit or debit card account is issued to a second account holder and has an associated available credit figure, the at least one first credit card account and the at least one second credit or debit card account being concurrently usable;
   c) receiving a request from a requestor to change the available credit figure associated with the first account, wherein the request to change the available credit figure is a request to decrease the available credit figure associated with the first account;
   d) determining whether the request to change the available credit figure associated with the first account will be approved by comparing the amount of the request with a figure established by the account issuer, wherein the figure established by the account issuer is the available credit figure associated with the first account; and
   e) if the amount of the request is less than or equal to the available credit figure associated with the first account, approving the request, wherein approving the request comprises:
      e.1) decreasing the available credit figure associated with the first account by the amount of the request, and
      e.2) increasing the available credit figure associated with the second account by the amount of the request.

4. The method of claim 1, further comprising the step of supplying an approval message if the available credit figure associated with the second account is greater than or equal to the amount of the request and supplying a rejection message if the available credit figure associated with the second account is less than the amount of the request.

5. The method of claim 1, further comprising the step of providing an account balance figure associated with the first account and wherein the account balance figure does not change as a result of the change in the available credit figures.

6. The method of claim 1, further comprising the step of providing an account balance figure associated with the second account and wherein the account balance figure does not change as a result of the change in the available credit figures.

7. The method of claim 1, wherein the requester is the second account holder.

8. The method of claim 7, further comprising the step of requiring the requester to provide identifying datum.

9. The method of claim 8, wherein the identifying datum is a second account number and a PIN code.

10. The method of claim 7, wherein the first account holder is the second account holder.

11. The method of claim 7, wherein the first account holder is a different entity from the second account holder.

12. The method of claim 11, wherein the first account holder is a child and the second account holder is a parent.

13. The method of claim 7, further comprising the step of creating an association linking the first account and the second account wherein the second account has authority to request an increase in the available credit figure associated with the first account.

14. The method of claim 7, further comprising the step of providing an expenditure counter associated with the first account.

15. The method of claim 14, further comprising the steps of:
   a) receiving a request from the second account holder to enable the first account; and
   b) setting the expenditure counter associated with the first account not equal to zero.

16. The method of claim 15, further comprising, the steps of:
   a) determining whether the expenditure counter associated with the first account is equal to zero;
   b) providing a saved available credit figure associated with the first account; and
   c) if the expenditure counter associated with the first account is equal to zero, setting the available credit figure associated with the first account equal to the saved available credit figure associated with the first account.

17. The method of claim 14, further comprising the steps of:
   a) receiving a request from the second account holder to disable the first account;
   b) setting the expenditure counter associated with the first account to zero;
   c) providing a saved available credit figure associated with the first account;
   d) setting the saved available credit figure associated with the first account equal to the available credit figure associated with the first account; and
   e) setting the available credit figure associated with first account equal to zero.

18. The method of claim 14, further comprising the steps of:
   a) receiving a request from the second account holder to limit the number of expenditures enabled for the first account to an expenditure number; and
   b) setting the expenditure counter associated with the first account to the expenditure number.

19. The method of claim 18, further comprising the steps of:
   a) determining whether the expenditure counter associated with the first account is equal to zero;
   b) providing a saved available credit figure associated with the first account; and
   c) if the expenditure counter associated with the first account is equal to zero, setting the available credit figure associated with the first account equal to the saved available credit figure associated with the first account.

20. A method of supervising credit or debit card account usage by selectively disabling in account, comprising the steps of:
   a) providing at least one first credit card account remotely disposed from at least one first credit card, wherein the first credit card account is issued by an account issuer to a first account holder
   b) providing at least one second credit or debit card account, remotely disposed from the at least one second credit card, wherein the second credit or debit card account is issued to a second account holder and has an associated available credit figure, the at least one first credit card account and the at least one second credit or debit card account being concurrently usable;
   c) creating an association linking the first account and the second account wherein the second account holder has authority to disable the first account;
   d) receiving a request from the second account holder to temporarily disable the first account; and
   e) temporarily disabling the first account.

21. A system for maintaining credit or debit card account records, comprising:
   a) a computer including at least one processor operatively connected to a storage device, the storage device being configured for storing credit or debit card account records wherein each account record is assigned to an account holder, the storage device remotely disposed from credit or debit card associated with the credit or debit account records;
   b) at least one first credit or debit card account record, each first account record assigned to a first account holder;
   c) means for a requestor to remotely enable and disable the first account;
   d) at least one second credit or debit card account record linked to the first account record, each second account record assigned to a second account holder, the at least one first first credit card account and the at least one second credit or debit card account being concurrently usable; and
   e) wherein the requestor is the second account holder.

22. The system of claim 21, wherein the first account holder is the second account holder.

23. The system of claim 21, wherein the first account holder is a different entity from the second account holder.

24. The system of claim 21, further comprising means for the requester to set the value of an expenditure counter associated with the first account record.

25. A system for maintaining credit or debit card account records, comprising;
   a) a computer including at least one processor operatively connected to a storage device, the storage device being configured for storing credit or debit card account records wherein each account record is assigned to an account holder, the storage device remotely disposed from credit or debit cards associated with the credit or debit account records;
   b) at least one first credit card account record, each first account record assigned to a first account holder;
   c) at least one second credit or debit card account record linked to the first account record, each second account record assigned to a second account holder, the at least one first credit card account and the at least one second credit or debit card account being concurrently usable;
   d) means for a requestor to change the value of the available credit figure associated with the first account, wherein the available credit figure remains denominated in a sinele unit of denomination, and wherein the requestor is the second holder.

26. The system of claim 25, wherein the first account holder is the second account holder.

27. The system of claim 25, wherein the first account holder is a different entity from the second account holder.

28. A computer-based method for processing a request to approve an expenditure using a credit or debit card, wherein the credit card is issued by an account issuer to a first account holder and is associated with a first credit card account, comprising the steps of:

a) receiving a request to approve the expenditure;
   b) accessing an available credit figure associated with the first account wherein the available credit figure is determined by an entity other than the account issuer;
   c) comparing the available credit figure with the amount of the expenditure wherein the available credit figure is determined by a second account holder, and wherein a second account and the first account are concurrently usable by the second account holder and the first account holder, respectively; and
   d) supplying an approval or rejection of the expenditure.

29. The method of claim 28, wherein the approval is supplied if the available credit figure is greater than or equal to the amount of the expenditure, and the rejection is supplied if the available credit figure is less than the amount of the expenditure.

30. The method of claim 28, further comprising the step of accessing an expenditure counter, associated with the first account, which limits the number of expenditures allowed for the first account holder.

31. The method of claim 30, wherein the expenditure counter is determined by an entity other than the account issuer.

32. The method of claim 30, wherein the expenditure counter is determined by a second account holder.

33. The method of claim 31, further comprising the step of, if an approval of the expenditure is supplied, updating the expenditure counter to reflect the approval of the expenditure.

34. A computer-based method for processing a request to approve an expenditure using a credit or debit card, wherein the credit or debit card is issued by an account issuer to a first account holder and is associated with a first credit or debit card account, comprising the steps of:

a) receiving a request to approve the expenditure;
   b) accessing an expenditure counter associated with the first account which limits the number of expenditures allowed for the account holder wherein the expenditure counter figure is determined by a second account holder, and wherein a second account and the first account are concurrently usable by the second account holder and the first account holder, respectively;
   c) supplying an approval or rejection of the expenditure.

35. The method of claim 34, further comprising the step of, if an approval of the expenditure is supplied, updating the expenditure counter to reflect the approval of the expenditure.

36. A system for receiving requests to approve a credit or debit card expenditure by a first account holder, assessing whether the expenditure will be approved or rejected, and providing an approval or rejection indication, comprising:

a) a computer including at least one processor configured to access a first credit or debit card account assigned to a first account holder, the computer remotely disposed from the first credit or debit card, the processor further configured to access a second credit or debit card account assigned to a second account holder; and
   b) a communications device configured for communicating a request to approve the expenditure to the computer;
   wherein the processor is configured to assess whether the expenditure will be approved or rejected by accessing an available credit figure associated with the first account and determined by an entity other than the account issuer, the processor further configured to approve or reject the expenditure responsive to the assessment, wherein the value of the available credit figure assigned to the first account is determined by the second account holder.

37. The system of claim 36, wherein the processor is configured to approve the expenditure if the available credit figure is greater than or equal to the amount of the expenditure and to reject the expenditure if the available credit figure is less than the amount of the expenditure.

38. A system for receiving requests to approve a credit or debit card expenditure by a first account holder, assessing whether the expenditure will be approved or rejected, and providing an approval or rejection indication, comprising:

a) at least one first credit or debit card account, each first account assigned to a first account holder;
   b) at least one second credit or debit card account, each second account assigned to a second account holder;
   c) a computer including at least one processor configured to access the first and second accounts, the computer remotely disposed from the credit or debit card of the first account holder, the computer further configured to provide concurrent use of the first and second credit or debit card accounts; and
   d) a communications device configured for communicating a request to approve the expenditure to the computer;
   wherein the processor is configured to assess whether the expenditure will be approved or rejected by accessing an expenditure counter associated with the first account, the processor further configured to approve or reject the expenditure responsive to the assessment, and wherein the expenditure counter is determined by the second account holder.

* * * * *